Patented May 11, 1937

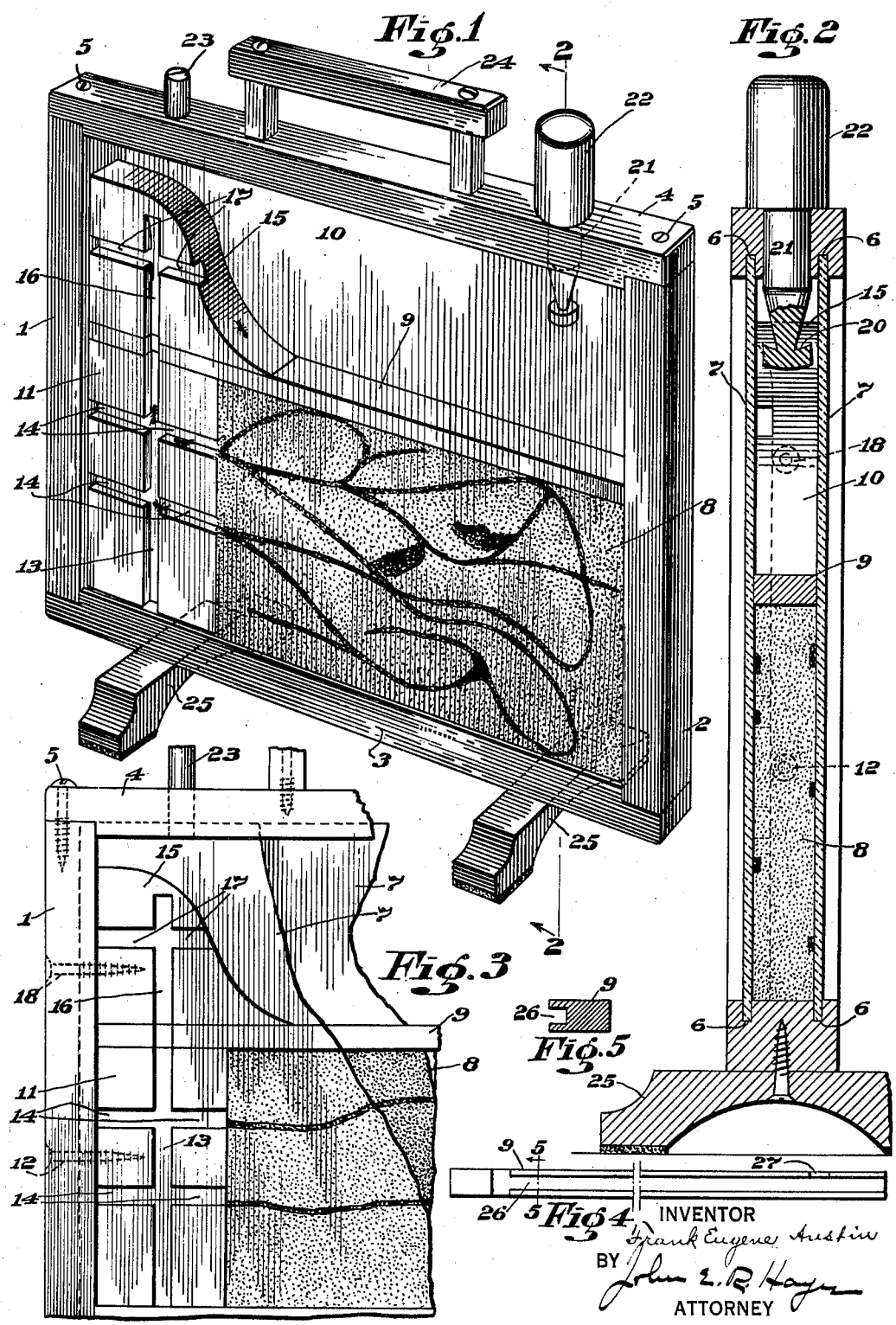

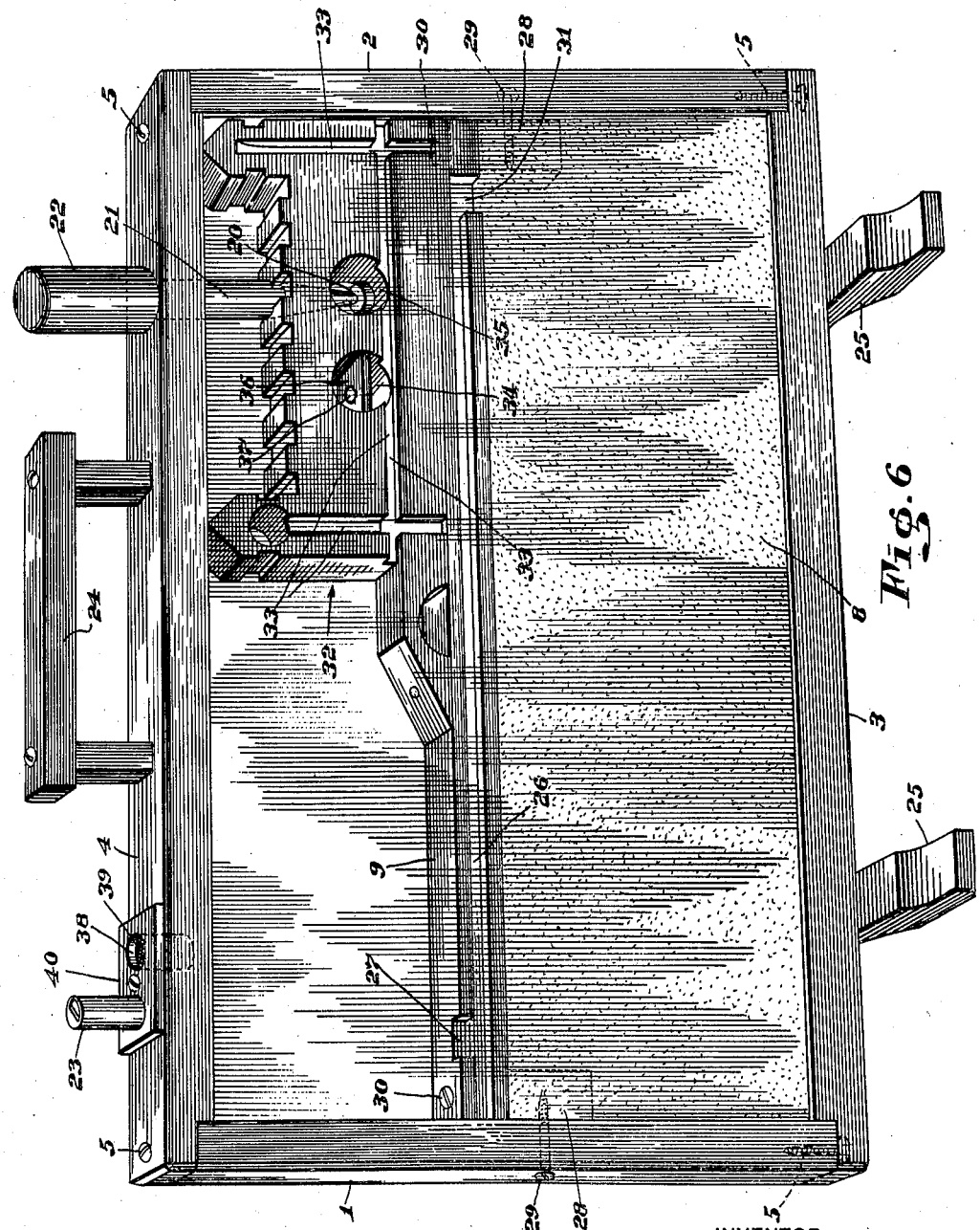

2,080,160

UNITED STATES PATENT OFFICE 2,080,160

SCENIC INSECT CAGE

Frank Eugene Austin, Hanover, N. H.

Application May 26, 1936, Serial No. 81,868
In Canada May 6, 1936

13 Claims. (Cl. 119—1)

The invention relates to a scenic insect cage, or one in which insects may be observed, studied, or photographed.

The invention pertains especially to a cage for housing insects of the burrowing type, such as ants, and the essential object of the invention is to provide a cage in which the insects will be maintained in a state as near their natural habitat as possible, and in manner by which they may best be seen.

In the drawings:

Fig. 1 shows a perspective of a cage embodying the invention.

Fig. 2 is a vertical cross section of the cage taken on line 2—2 of Figure 1.

Fig. 3 is a front elevation of a fragmental part of the cage in enlarged detail.

Fig. 4 is a front elevation of a slight structural modification of an elemental part of the cage.

Fig. 5 is a cross section on the line 5—5 of Fig. 4; and

Fig. 6 is a perspective of a slightly modified cage construction.

Referring to the drawings:

The cage comprises a frame consisting of side bars 1 and 2; a bottom bar 3; and a head bar 4. These bars are connected in any suitable manner, as by screws 5, to form a substantially rectangular frame.

The inner faces of the respective bars are provided with spaced grooves 6, into which fit panels 7, made of any suitable material, of which at least one, and preferably both, are transparent, such as panes of glass. These panes are inserted when the head bar is removed, and upon attaching the head bar the panes are held securely in place.

The space between the panels, or panes, forms the enclosure within which the insects are confined. Within the enclosure is placed a filling 8 of earth, sand, or other material, in which the insects may burrow, for it is the burrowing type of insects, such as ants, to which the invention especially pertains.

Located above the filling 8, preferably horizontally arranged, with extension transverse the enclosure, is a bar 9. This bar separates the chamber 10 above the bar, which may be termed the gallery chamber, from the chamber below in which the filling is contained, and which may be termed the mine chamber, for in this chamber the burrowing or tunneling takes place. The bar 9 forms a platform to the gallery chamber and assists in holding the filling in place.

Arranged within the enclosure below the bar 9 at the side of the filling and extending preferably from the bar 9 to the bottom of the cage, is a block 11. This block is held in place by a screw 12 passed through the side bar 1 of the frame and entering the block. The block 11 functions as an immediate lateral support for the filling which contacts with it. Leading down through the bar 9, or gallery platform, and through the block 11, on the side of the bar and block adjacent the glass and at a point removed from the edge of the block facing the filling, is a shaft 13. This shaft preferably extends from the gallery platform to the bottom of the cage. Formed, also, in the block 11 on the side thereof facing the glass is one or more, and preferably a plurality of, cross cuttings 14 from the shaft 13, and certain of these cuttings open on to the filling.

The bar 9, or floor of the gallery chamber, forms the place on which the insects congregate when not at work. From this platform they pass down through the shaft 13 into the cross cuttings, and thence into the filling where they work. By this means the insects are segregated, so that they may be individually observed, for they generally pass singly through the shaft and cross cuttings.

The facility for observation is increased by providing the gallery platform with a structure 15 consisting of a block at the side of the gallery chamber and located above the block 11. The shaft 13 has upward extension 16 into the side of this block, and entrance to the head of the shaft is through a cross cutting 17 in the block 15. Accordingly, the insects in order to enter the shaft must first pass up on the block 15, and thence through the cross cutting 17 to the shaft. The block 15 assists in holding the bar 9 in place for the bar 9 lies between the block 15 and the block 11 and the block 15 is held securely in place by means of a screw 18 passed through the side of the frame and entering the block.

Any suitable means may be provided for admitting air to the enclosure, in fact, sufficient air will enter the enclosure around the edges of the panes of glass which, while more or less tight, do not form a seal-forming connection with the grooves in which they are contained.

Food and drink are given the insects by means of a feed receptacle 20 within the enclosure borne by a shank 21 passed down through an opening in the head bar, and held by a handle 22 on the top end of the shank which bears against the head bar when the shank and feed receptacle are in place.

The cage is provided with a whistle 23 of common type passed down through the head bar.

On blowing this whistle the insects are excited into great activity owing probably to the vibration imparted to the antennae with which the insects are provided.

The cage is provided with a handle 24 by which it may be carried. This handle is secured to the head bar 4 of the frame.

The cage, when at rest, stands upon feet 25 secured to the bottom bar 3.

Inasmuch as the bar 9 and block 10 hold the filling securely in place, the cage, provided with insects, may be transported without harm to the insects, as might otherwise occur if the filling was loose within the enclosure. The bar and block assist, also, in keeping the filling tightly packed so that the cage can be moved, after tunneling of the filling, without destroying the tunnels.

A further advantage of the cross bar 9 is that it permits of the cage being cleaned, and the filling removed, without disturbing the insects in the cage, or those insects not then in the filling. As previously described, the filling is held in place partly by the cross bar 9, and partly by the bottom bar 3. On turning the cage upside down the bottom bar may be removed on taking out the screws 5, and then upon reversing the cage the filling will fall out without disturbing the chamber above the cross bar, and any insects in the filling may be returned to the cage. New filling may then be placed in the cage, and the bottom bar restored.

A still further advantage of the cross bar resides in the fact that it makes possible a visual indication of the amount of work done by the insects, providing a floor upon which the excavated material is piled up.

The cross bar 9 may also be provided with a groove, or channel, 26 adjacent the glass, (See Figs. 4 and 5) forming a way along which the insects may travel, and which connects with the shaft 13. Entrance to this way is through an inlet opening 27 from off the top of the cross bar.

In Fig. 6 a further modification in the structural form of the cage is seen. Here the outer frame of the cage, holding the panes of glass, are the same as before, excepting, it is preferred in this modified structure, that the cage be more or less elongated, as compared with the cage previously described.

In the modified structure the bar 9 is retained, separating the interior of the cage into separate chambers or compartments, and assisting in the retention of the filling 8. The bar is held in place by means of small blocks 28 secured by fastenings 29 to the respective side bars 1 and 2 of the frame, and the ends of the cross bar, resting upon the tops of these blocks, are secured thereto by fastenings 30. The blocks are concealed by the filling. The cross bar 9 is provided with a channel 26 with entrance 27 thereto from the top of the cross bar, and with outlet 31 directly to the filling.

Built upon the cross bar at a point preferably removed from the opening 27 is a structure 32 provided with a variety of channels 33 forming ways adjacent the glass along which the insects may travel. The structure is also provided with openings 34 and 35 with which the channels connect. The openings 34, 35 preferably extend through the contained structure and open onto both panes of glass, giving better visibility for studying the insects. The opening 34 is provided with a platform 36 extending diametrically across the opening, and this platform has an opening 37 in it.

The feed receptacle 20, shank 21, and handle 22, useful for assisting in the feeding of the insects, are the same as before, excepting that the shank is extended down through the superstructure so that the feed receptacle will lie within the opening 35 which forms the place where the insects may congregate and feed, the feed receptacle lying quite near the adjacent wall of the opening so that the insects may stand upon this wall while eating from the feed receptacle.

Any suitable means may be provided for ventilating the cage, as by an opening 38 in the upper cross bar 4, closed by a screen 39 borne by a plate 40 fixed to the cross bar.

The term "glass" as used herein, and in the appended claims, is meant to include any transparent material which may be employed to form a transparent panel, or face, to the cage, through which the interior thereof may be observed.

I claim:

1. A scenic insect cage comprising parts forming an enclosure for containing insects and a filling in which the insects may burrow, and which cage is provided with a glass side, and means within said enclosure provided with a cut adjacent the glass with an end opening to said filling and along which cut the insects travel to said filling.

2. A scenic insect cage comprising parts forming an enclosure for containing insects and a filling in which the insects may burrow, and which cage is provided with a glass side, and means within said enclosure exterior to but in immediate contact with said filling provided with a cut adjacent the glass with an end opening to said filling and along which cut the insects travel to said filling.

3. A scenic insect cage comprising parts forming an enclosure for containing insects and a filling in which the insects may burrow, and which cage is provided with a glass side, and a bar fixture within the enclosure separating it into separate compartments, one an upper compartment, and the other compartment containing the filling, and which bar assists in the retention of the filling, said bar having in it a cut adjacent the glass with openings into and through which cut the insects travel in their passage to and from said filling.

4. A scenic insect cage comprising parts forming an enclosure for containing insects and a filling in which the insects may burrow, said parts inluding a removable bottom for the cage and a glass side, both assisting in the retention of the filling, and a bar fixture within the enclosure forming a compartment above the filling and separating the filling from said compartment whereby on removing said bottom of the cage the filling will fall out of the cage without dislodgement of the insects in said upper compartment.

5. A scenic insect cage comprising parts forming an enclosure for containing insects and a filling in which the insects may burrow, and which cage is provided with a glass side, a fixture within said enclosure separating the chamber containing said filling from an upper chamber above said filling and forming a floor to said upper chamber, and a fixture arranged alongside said filling, both fixtures assisting in the retention of the filling and provided with cuts adjacent the glass whereby the insects will be segregated to travel along a path adjacent the glass in passing from the floor of the upper chamber to the filling.

6. A scenic insect cage comprising parts forming an enclosure for containing insects and a filling in which the insets may burrow, and which cage is provided with a glass side, a bar within said enclosure separating the filling from an upper chamber above the filling and forming a floor to the upper chamber, and a block located below the bar within the enclosure at one side of the filling and with which block the filling is in immediate contact, said block being provided with a shaft and cross cutting from the shaft adjacent the glass, and along which shaft and cross cutting the insects travel from the floor of the upper chamber to the filling.

7. A scenic insect cage comprising parts forming an enclosure for containing insects and a filling in which the insects may burrow, and which cage is provided with a glass side, a block within the cage at one side of the filling, and with which block the filling is in immediate contact, said block being provided with a shaft and a cross cut to the filling, both shaft and cross cut being adjacent the glass, and a bar within the enclosure above said block separating the filling from an upper chamber and forming a floor to said upper chamber, said bar having in it a cut adjacent the glass with opening into said cut from said floor of the upper chamber and with opening out of said cut to said shaft.

8. A scenic insect cage comprising parts forming an enclosure for containing insects and a filling in which the insects may burrow, and which cage is provided with a glass side, a bar within said enclosure separating the filling from an upper chamber above the filling and forming a floor to the upper chamber, said bar having an opening through it whereby the insects may pass from the upper chamber to the filling, and a structure mounted upon said bar within said upper compartment provided with cuts in it adjacent the glass and along which cuts the insects travel from off said floor of the upper compartment.

9. A scenic insect cage comprising parts forming an enclosure for containing insects and a filling in which the insects may burrow, and which cage is provided with a glass side, a bar within said enclosure separating the filling from an upper chamber above the filling and forming a floor to the upper chamber, a block located below the bar within the enclosure at one side of the filling and with which block the filling is in immediate contact, a structure arranged upon said bar above and in alignment with the block, said structure and block being provided with a shaft extending through said bar and with cross cuttings from the shaft adjacent the glass whereby the insects in passing from the floor of said upper chamber to the filling will pass on the structure through the cross cutting therein to the shaft, thence down the shaft and through the cross cutting in the block to the filling.

10. A scenic insect cage comprising parts forming an enclosure for containing insects and a filling in which the insects may burrow, and which cage is provided with a glass side, a bar fixture within the enclosure separating the filling from an upper compartment, a structure mounted upon the bar fixture having an opening in it open to the glass and with a cut leading from said opening and communicating with the main chamber of the upper compartment, a withdrawable feed receptacle within the opening in said structure, and means for supporting said feed receptacle accessible from outside the cage.

11. A scenic insect cage comprising parts forming an enclosure for containing insects, and a whistle extending through the wall of said enclosure in open communication with the chamber of the enclosure whereby air and vibrations on blowing the whistle will have direct entry into said chamber.

12. A scenic insect cage comprising parts forming an enclosure for containing insects and a filling in which the insects may burrow, and which cage is provided with a glass side, a bar fixture within the enclosure separating it into separate compartments, one an upper compartment, and the other compartment containing the filling, and which bar assists in the retention of the filling, said bar having in it a longitudinal cut adjacent the glass with openings therefrom into and out of said respective compartments and along which longitudinal cut the insects travel in their passage to and from said respective compartments.

13. A scenic insect cage comprising parts forming an enclosure for containing insects, said enclosure having an opening through it, a whistle mounted on the enclosure at said opening and in open communication with the chamber of the cage whereby air and vibrations on blowing the whistle will have direct entry into said chamber.

FRANK EUGENE AUSTIN.